United States Patent [19]
Gerard

[11] 3,964,335
[45] June 22, 1976

[54] DISENGAGEABLE REDUCTION GEAR UNIT

[76] Inventor: Pierre Y. Gérard, 6 rue Donizetti, 75016 Paris, France

[22] Filed: Dec. 10, 1974

[21] Appl. No.: 531,306

[30] Foreign Application Priority Data
Nov. 21, 1974 France .............................. 74.38303

[52] U.S. Cl. ................................ 74/425; 74/89.14
[51] Int. Cl.² ........................................... F16H 1/16
[58] Field of Search .................... 74/425, 426, 89.14

[56] References Cited
UNITED STATES PATENTS
1,559,970  11/1925  Meahl .................................. 74/426
2,348,734  5/1944  Freeman .............................. 74/425

Primary Examiner—Samuel Scott
Assistant Examiner—Wesley S. Ratliff, Jr.
Attorney, Agent, or Firm—Edwin E. Greigg

[57] ABSTRACT

A driving element such as a worm is mounted within the bore of a cage consisting of two cylindrical end bodies associated in coaxial relation and rotatable within housings formed in the gear-box. The axes of the bore and of the end bodies are relatively displaced so that the driving element is engaged with the driven element such as a wormwheel in one angular position of the cage but disengaged in an angular position which is displaced by 180° with respect to the first, means being provided for locking the cage in each position.

3 Claims, 2 Drawing Figures

DISENGAGEABLE REDUCTION GEAR UNIT

This invention relates to the disengagement of gears which have a high transmission ratio.

Although the invention can apply to helical gears, it is primarily directed to worms and wormwheels having axes at right angles and a high reduction ratio.

When it is necessary to produce action directly on the driven wheel in a gear system of this type after disengaging the pinion or worm from its driving unit, the resisting torque is very high and calls for the application of a considerable force. The resisting torque can even be infinite when the helix angle of the pinion or worm with respect to the shaft axis is too large, in which case the gear is said to be irreversible.

It is true that, very broadly speaking, rotational motion is not necessarily imparted to the driven wheel of the gear system but to the element which is coupled mechanically to this latter and which can very often be a running-wheel. This is the case, for example, when the reduction-gear unit is intended to transmit motion to the driving wheel of a machine which is intended to move very slowly during use but which can nevertheless be drawn at a much higher speed in order to move it from one work location to another, or else when the "work" and "transportation" movements of travel are intended to take place in different directions, in which case the running-wheels are designed to pivot about a vertical axis through an angle which is usually 90°.

A problem of the kind just mentioned is encountered in particular in a sprinkler irrigation line which revolves about a fixed supply point. In a system of this type, the irrigation line can attain a length of 700 meters and is constituted by a plurality of spans carried on bearing points or "towers." Each tower is equipped with two running-wheels mounted on axles which are parallel to the direction of the irrigation line and driven by an electric motor through a worm-gear reduction unit at a speed which is usually less than 1 revolution per minute. It is clearly ensured that each connection between two adjacent spans is endowed with a certain flexibility of articulation by means of a system of contacts operated in dependence on the relative angular displacement of the two spans considered. The motor of the corresponding tower accordingly starts up when the angle made by the two spans attains a predetermined value and stops when the angle attains substantially the same value in the opposite direction. The irrigation line as a whole thus revolves about one end of the line by intermittent re-alignment of successive spans with the end span which is remote from the fixed point, the motor of any one tower being in operation at less frequent intervals as said tower is located nearer to the fixed point.

When the irrigation is sufficient, the sprinkler system is drawn to the next fixed supply point, the distance to be covered being within the range of L to 2L (L = length of sprinkler irrigation line) according to the sprinkler pattern and position layout which are contemplated. The sprinkler system can clearly be displaced only in the longitudinal direction. To this end, the wheels of each supporting tower are pivotally displaced through an angle of 90° in order to be brought into alignment with the machine after relieving the load on said wheels and lifting these latter above the soil by means of a jack whilst the driving rods are disengaged from the worms.

As stated earlier, it is then necessary to ensure that the running-wheels are capable of rotating without causing the motion of the worms as this would set up an excessive value of resisting torque. The case of a sprinkler system is mentioned here solely by way of example without implying any limitation whatsoever, many other machines may require the same possibility even when the movements of the machine take place in the same direction for the purposes of both operation and transportation.

Up to the present time, the solution had consisted in adopting one of the two following arrangements : running-wheel with a disengageable hub or wheel slidably mounted on an axle with dog-clutch engagement. These arrangements entail the need for complicated and costly equipment.

The invention proposes a gear system in which the driving pinion or worm and the driven wheel can be engaged or disengaged at will, thus offering an advantage in that the driven wheel can be left continuously coupled with the element to be driven and consequently that the complexity and cost of the device as a whole can be reduced. The invention is accordingly applicable to any element to be driven and can be utilized not only in machines such as those mentioned in the foregoing but also in many other devices, for example in a pile-driving winch. When the two elements of the gear system are disengaged, the driven wheel is obviously capable of rotating freely in both forward and reverse directions.

The invention is directed to a reduction gear unit comprising a driven wheel and a driving element (pinion, worm) within a gear-box in which the driving element is rotatably mounted within the bore of a cage constituted by two coaxial cylindrical end bodies which are capable of rotating within corresponding respective housings formed in the gear-box and rigidly connected to each other by means of a semi-cylindrical cheek, the axis of said bore being displaced with respect to the axis of the end bodies in a direction substantially at right angles to the diametral plane on each side of which the cheek extends so that, in a first relative angular position of the cage with respect to the casing, the driving element is engaged with the driven wheel and that in an angular position displaced by 180° with respect to the first, the driving element is disengaged from the driven wheel, a means for locking the cage being provided for each of said two positions.

A better understanding of the invention will be gained from the following description and from the accompanying drawings, wherein.

Figure 1:
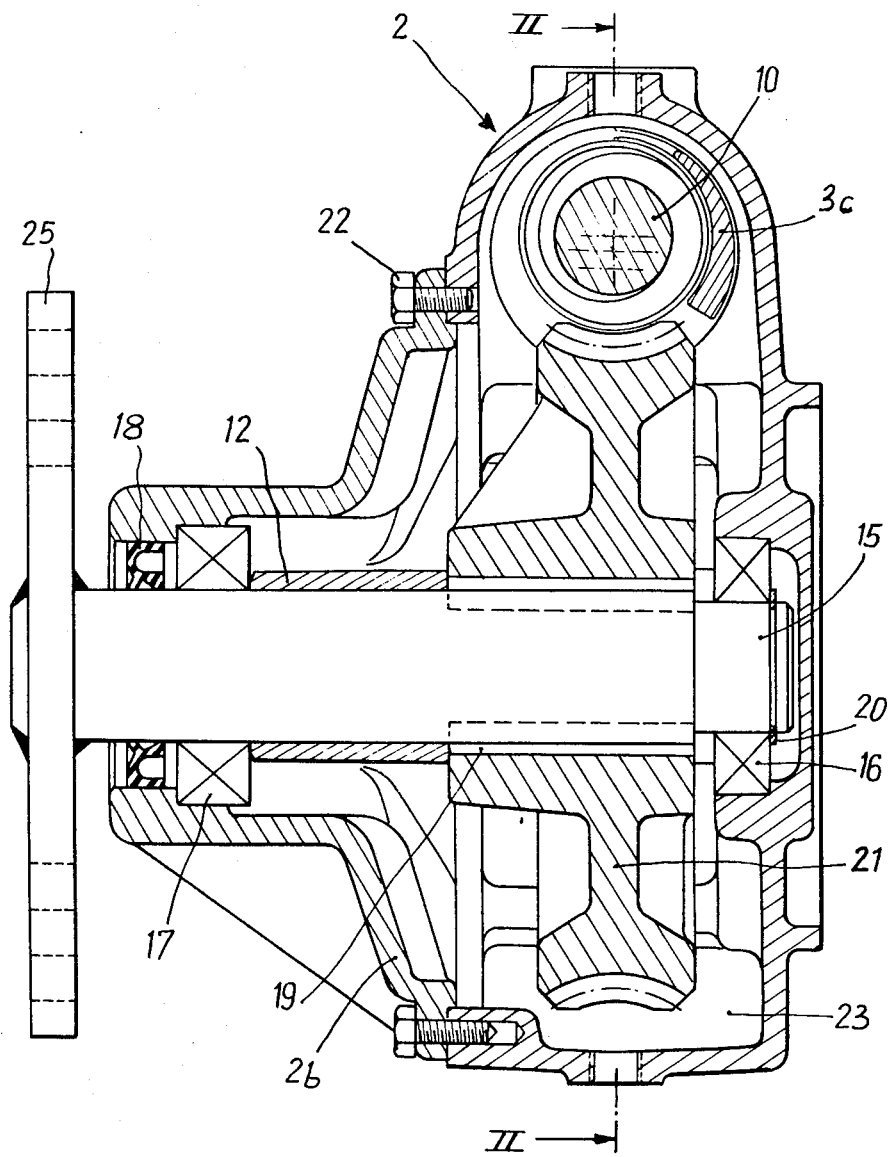
FIG. 1 is a view of a gear unit in accordance with the invention, this view being taken in cross-section along the axis of the driven wheel and at right angles to the axis of the driving worm.

The drawing shows by way of non-limitative example a gear unit (in this case with shafts at right angles) consisting of a driving worm which has a high reduction ratio of the order of 50:1. By way of example, a reduction-gear unit of this type can be employed for the purpose of transmitting a torque to the axle of a driving running-wheel which is intended to be driven at low speed.

The gear unit is mounted within a gear-box 2 fitted with a top filler cap 1 and breather and with a bottom drain plug 11. The gear-box is formed of a casing 2a, the end-wall of which is provided with a recess for a bearing 16 with tapered rollers in this example and with a cover 2b which is secured to the casing by means of a plurality of screws such as the screw 22.

The gear unit comprises a driving worm 10 and a driven wormwheel 21.

The driven wormwheel 21 is mounted within the casing 2a and keyed (by means of a key 19) on a shaft 15, one end of which engages within the bearing 16 and is maintained therein by means of the split locking means 20. The other end of said shaft 15 passes longitudinally through the cover 2b and carries a wheel plate 25 on the portion which emerges from the gear-box. Within the interior of the cover 2b, the shaft 15 passes through a tapered-roller bearng 17 which is held in position on one side by an annular shoulder of said cover and on the other side by a spacer sleeve 12 and a seal-type ring 18 which ensures leak-tightness between the interior and the exterior of the gear-box.

The worm 10 is cut in one piece together with its shaft 14 and consists of an endless screw having a thread which is intended to mesh with the wormwheel 21. Said worm is rotatably mounted within a cage 3 by means of two bearings 4 having tapered rollers.

The cage 3 is formed in one piece by means of two coaxial cylindrical end bodies 3a and 3b which are joined to each other by a lateral cheek 3c and capable of supporting the shaft 14 so that it may be moved toward and away from the axis of the wormwheel 21. The end bodies which carry the bearings 4 are mounted within respective associated cylindrical housings formed in the top portion of the gear-box and are maintained therein by means of circlips 7. The bodies 3a and 3b are capable of rotating within their respective housings through an angle of at least 180°. O-ring seals 5 are placed between the external lateral surface of the bodies 3a and 3b and the internal lateral surface of their housings. The body 3b is closed at the end and the body 3a is traversed by the shaft 14 which carries at its extremity a means of coupling with a driving rod (not shown in the drawings). The cage 3 has a longitudinal bore corresponding to the diameter of the bearings 4. The axis of said bore is displaced with respect to the common axis of the bodies 3a and 3b in a direction substantially perpendicular to the diametral plane which passes through the central generator-line of the cheek 3c. An operating lever 9 is fixed on the end-wall of the body 3b and maintained within a diametral groove of said endwall by means of a screw 8. Said lever is of relatively small thickness and thus has a certain degree of flexibility so that it can be engaged within safety lugs 6a, 6b which are mounted on the gear-box.

Figure 2:
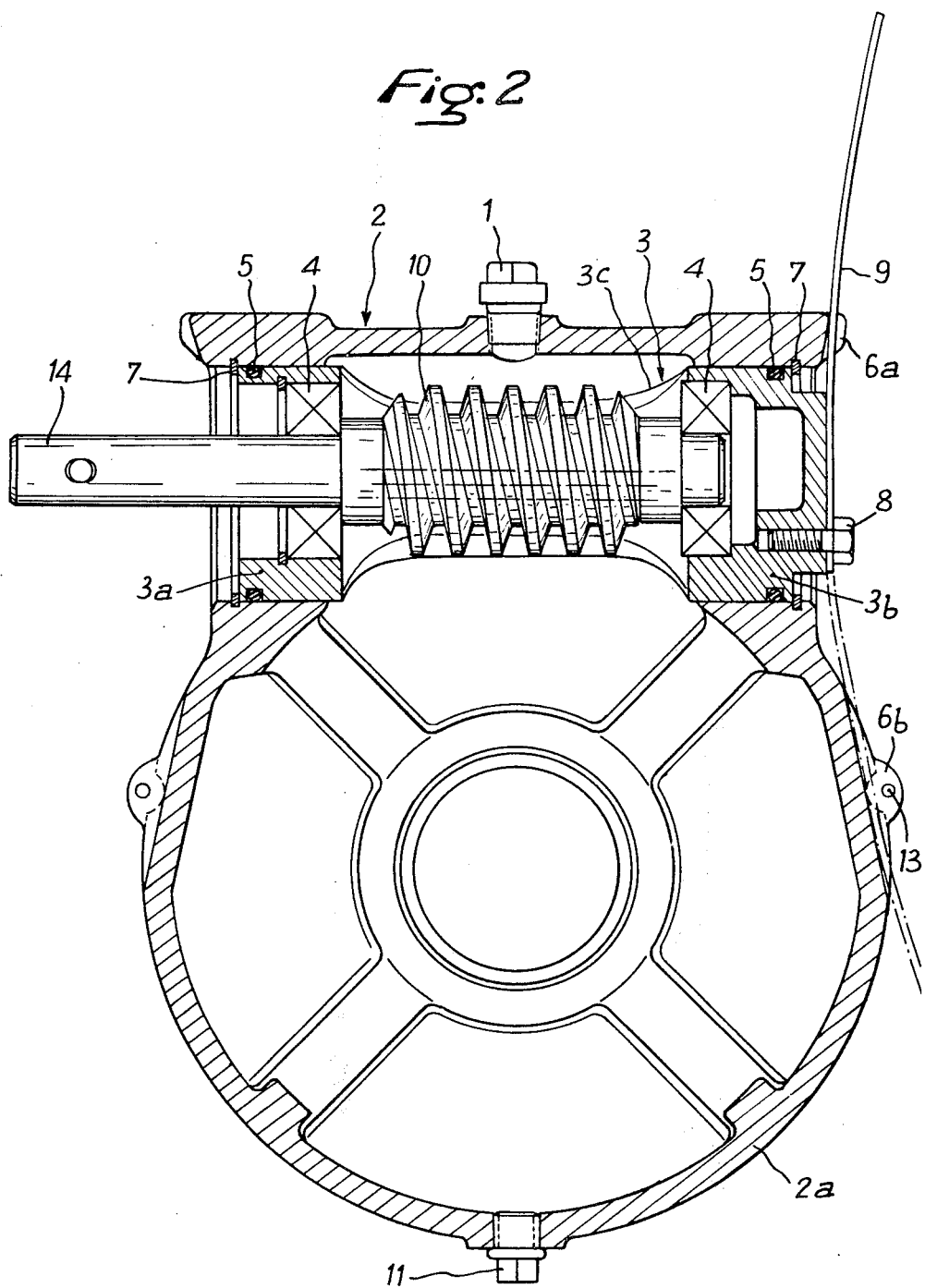
FIG. 2 is a view in cross-section taken along line II—II of FIG. 1, the driven wheel having been removed whilst the worm has not been in contact with the cutting plane.

When the lever is engaged within the lug 6a (as shown in FIG. 2), the cage is in a position such that the thinnest portion of the lateral walls of the bodies 3a and 3b is located at the top ; in other words, the distance between the axis of the worm 10 and the axis of the wormwheel 21 is as great as possible. Thus it is only necessary to choose the degree of eccentric displacement of the worm 10 within the cage 3 in order to ensure that the worm and wormwheel cannot cooperate in this position. By lowering the lever 9 after having disengaged this latter from the lug 6a, the cage 3 is caused to rotate. When the lever 9 has pivoted through an angle of 180°, it is engaged within the lug 6b (in the position shown in chain-dotted lines in FIG. 2). As a safety recaution, a locking-pin can be placed within drilled holes 13 formed in the flanges of the lug 6b. The cage 3 has been subjected to the same angular displacement as the lever and the distance between the axis of the worm 10 and the axis of the wormwheel 21 is then at a minimum. In this position, these two elements are in mesh and the gear unit is engaged.

The gear-box 2 is fitted with a filler cap 1 and with a drain plug 11 which make it possible to provide an oil bath within the gear-box.

I claim:

1. A reduction gear unit comprising a driven wheel and a driving element such as a pinion or worm within a gear-box, wherein the driving element is rotatably mounted within the bore of a cage constituted by two coaxial cylindrical end bodies which are capable of rotating within corresponding respective housings formed in the gear-box and rigidly connected to each other by means of a semi-cylindrical cheek, the axis of said bore being eccentric with respect to a periphery of the end bodies and being displaceable with respect to the axis of the end bodies in a direction substantially at right angles to the diametral plane on each side of which the cheek extends so that in a first relative angular position of the cage with respect to the casing the driving element is engaged with the driven wheel and that in an angular position displaced by 180° with respect to the first the driving element is disengaged from the driven wheel and means for immobilizing the cage for each of said positions.

2. A reduction gear unit according to claim 1, wherein one of the end bodies of the cage is attached to an operating lever which extends in a radial direction and wherein, in each of the two positions of said lever which are located at an angular distance of 180° and correspond to the aforementioned two positions of the cage, said lever is immobilized by a temporary locking means which constitutes the means for immobilizing the cage.

3. A reduction gear unit according to claim 1, wherein the axes of the driving element and of the driven wheel are substantially horizontal and said gear-box is fitted with a filler cap at the top portion thereof and with a drain plug at the bottom portion thereof to provide for attachment of a disengageable oil-bath gear unit.

* * * * *